United States Patent
Branscomb et al.

(10) Patent No.: US 6,581,485 B1
(45) Date of Patent: Jun. 24, 2003

(54) CONTROL LEVER KNOB RUBBER BOOT INTERFACE

(75) Inventors: David Andrew Branscomb, Dubuque, IA (US); David Joseph Klas, Dyersville, IA (US)

(73) Assignee: Deere & Company, Moline, IL (US)

( * ) Notice: Subject to any disclaimer, the term of this patent is extended or adjusted under 35 U.S.C. 154(b) by 65 days.

(21) Appl. No.: 09/686,752

(22) Filed: Oct. 9, 2000

(51) Int. Cl.[7] ................................................. F16J 15/50
(52) U.S. Cl. ............................. 74/18.1; 74/18; 74/566; 74/523
(58) Field of Search .................... 74/18, 18.1, 18.2, 74/523, 566; 428/34.1; 277/636

(56) References Cited

U.S. PATENT DOCUMENTS

| | | | |
|---|---|---|---|
| 3,797,613 A | * 3/1974 | Nehr ................. 188/79.5 GE |
| 3,827,313 A | * 8/1974 | Kiessling ............... 74/471 XY |
| 4,137,792 A | 2/1979 | Ceccano ..................... 74/473 |
| 4,228,875 A | * 10/1980 | Haraikawa et al. ......... 188/72.7 |
| 4,249,644 A | 2/1981 | Uraban ................... 188/196 D |
| 4,253,675 A | * 3/1981 | St. Laurent ................ 74/18 X |
| 4,296,773 A | 10/1981 | Harshman et al. ........... 137/312 |
| 4,508,198 A | * 4/1985 | Gornall et al. ............. 188/71.4 |
| 4,581,951 A | 4/1986 | Watson ........................ 74/473 |
| 4,730,834 A | 3/1988 | Ukai et al. .................. 277/212 |
| 4,805,921 A | * 2/1989 | Ukai et al. .................. 74/18 X |
| 4,927,678 A | * 5/1990 | Lallement ................... 428/36.9 |
| 5,176,390 A | * 1/1993 | Lallement ................... 74/18 X |
| 5,560,253 A | 10/1996 | Ishikawa et al. .............. 74/473 |
| 5,755,138 A | 5/1998 | Mototani et al. ............. 74/471 |
| 5,875,682 A | 3/1999 | Smith ......................... 74/471 |
| 5,979,268 A | 11/1999 | Freberg et al. ............... 74/531 |

FOREIGN PATENT DOCUMENTS

| | | | |
|---|---|---|---|
| DE | 29 02 455 A1 | 7/1980 | |
| EP | 0 800 132 A1 | 10/1998 | |
| JP | 58-166031 | * 10/1983 | ............ 74/18 |

* cited by examiner

Primary Examiner—Vinh T. Luong

(57) ABSTRACT

A control lever for a control console of a work vehicle comprises an arm and a knob. One end of the arm is coupled to the control valve linkage for positioning the control valve. The other end of the arm is mounted to the knob. The knob is provided with a cylindrical shaft having a first groove and a second groove. The first and second grooves adjoin one another. The first groove is deeper than the second groove. A rubber boot extends between the knob and the control console. The rubber boot has a circular control lever opening through which the control lever extends. The circular control lever opening is provided with an inwardly extending flange. The inwardly extending flange is received in the first groove. A downwardly extending foot extends from the inwardly extending flange and is received in the second groove. The inwardly extending flange and the foot are separated from one another by a step that corresponds to the radial differences between the first and second grooves.

12 Claims, 1 Drawing Sheet

CONTROL LEVER KNOB RUBBER BOOT INTERFACE

BACKGROUND OF THE INVENTION

1. Field of the Invention

The present invention is directed to the interface between the rubber-sealing boot of a control lever and the control lever knob.

2. Description of the Prior Art

In operating a work vehicle, such as a bulldozer, the operator controls a plurality of work operations through manipulating various control levers that position the hydraulic control valves. The hydraulic control valves in turn regulate the flow of pressurized hydraulic fluid to hydraulic cylinders that manipulate the bulldozer blade.

Typically, the control levers extend upwardly through a control console located in the operator's cab. The control lever has an arm and a knob that is affixed to the arm. The arm is operatively coupled to a valve control linkage that regulates the hydraulic control valve in response to movement of the control lever. The operator grasps the knob of the control lever for manipulating the arm of the control lever.

The control console is provided with control apertures through which the control levers pass. These apertures are larger than the diameter of the control lever to allow for pivotal movement of the control lever. To prevent dust, dirt and debris from entering the control console, the control aperture may be covered by a rubber boot that engages the control lever and the edge of the control aperture. The boots can be coupled to the knob by a tongue and groove joint. A secondary fastener in the form of adhesive is used to bond the rubber boot to the knob.

SUMMARY

It is an object of the present invention to provide a rubber boot/control knob interface that does not require a secondary fastener.

A control lever for a work vehicle extends upwardly through a control aperture in a control console. The control lever comprises an arm and a knob. One end of the arm is coupled to the control valve linkage for positioning the control valve. The other end of the arm is mounted to the knob. The knob is provided with a cylindrical shaft having a first groove and a second groove. The first and second grooves adjoin one another to form a tandem stepped groove. The first groove is deeper than the second groove having a smaller diameter. A rubber boot extends between the knob and the control console. The rubber boot has a circular control lever opening through which the control lever extends. The circular control lever opening is provided with an inwardly extending flange. The inwardly extending flange is received in the first groove. A downwardly extending foot extends from the inwardly extending flange and is received in the second groove. The inwardly extending flange and the foot are separated from one another by a step that corresponds to the radial differences between the first and second grooves.

DETAILED DESCRIPTION

Figure 1:
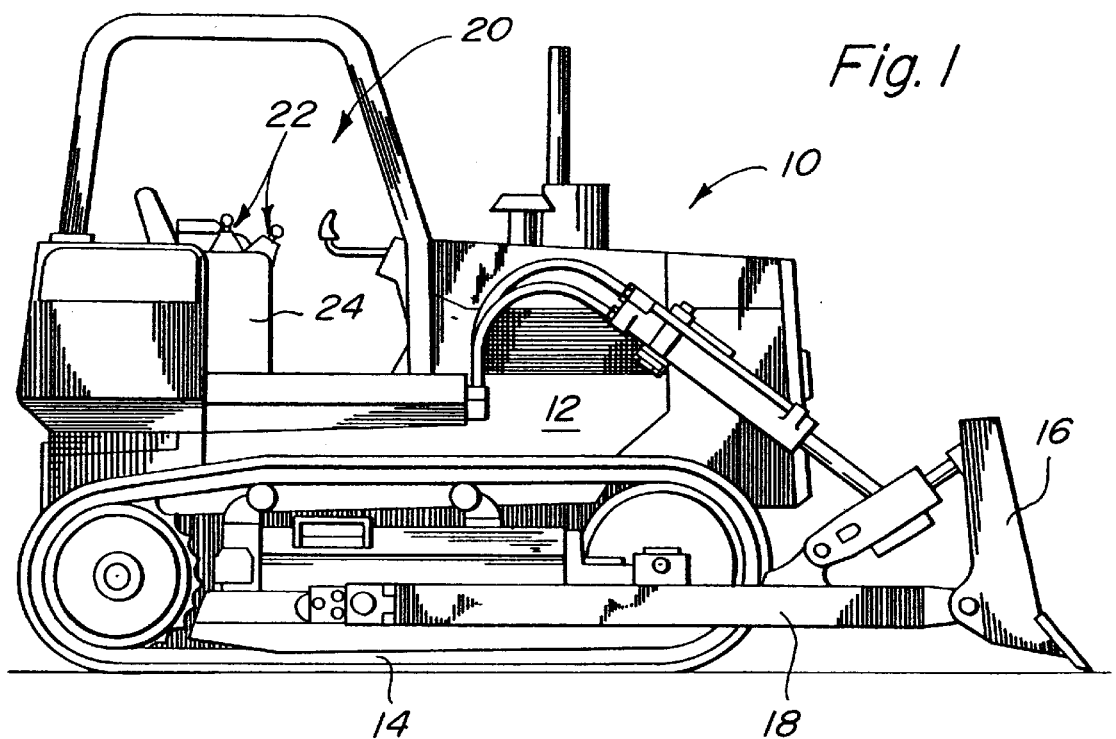
FIG. 1 is a side view of a bulldozer having control levers.
Figure 2:
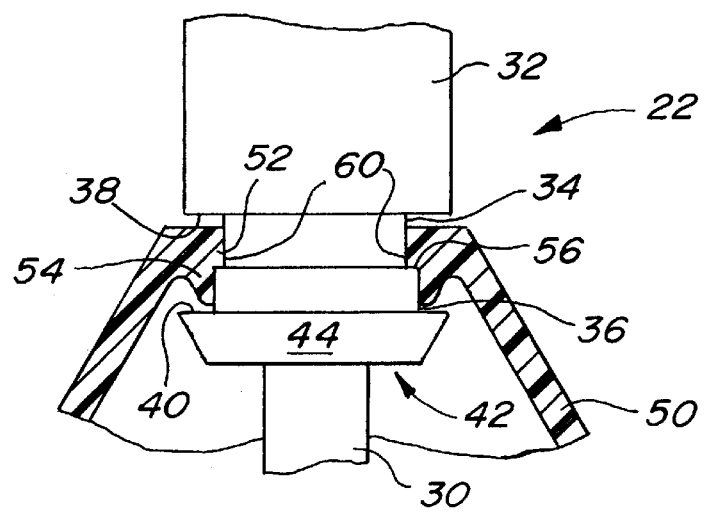
FIG. 2 is a partial cross sectional view of the rubber boot/control knob interface.

FIG. 1 illustrates a work vehicle 10 comprising a bulldozer. The work vehicle 10 is provided with a frame 12 and ground engaging tracks 14 for propelling the vehicle 10. The frame 12 is provided with a work implement in the form of a bulldozer blade 16 that is coupled to the frame 12 by linkage 18. The position of the blade 16 relative to the frame 12 is controlled by hydraulic cylinders. The operator controls the vehicle 10 and the position of the bulldozer blade 16 from control cab 20. The operator manipulates the control levers 22 that extend out of control console 24. Although the present invention is illustrated as being used on a tracked bulldozer, this invention can also be used on other types of work vehicles, wheeled or tracked.

Each control lever 22 comprises an arm 30 and a knob 32. One end of the arm 30 is coupled to the control valve linkage. The other end of the arm 30 is coupled to the knob 32. The base of the knob 32 is provided with a first groove 34 and an adjacent second groove 36. The first groove 34 is located between the second groove 36 and a first radially extending face 38. The second groove 36 is located between the first groove 34 and a second face 40. The first groove 34 is deeper than the second groove 36. That is the base of the first groove 34 has a smaller diameter than the base of the second groove 36. A second radially extending face 40 is formed by knob flange 42. The knob flange 42 has a conical face 44.

A rubber-sealing boot 50 extends between the control console 24 and the knob 32. The rubber boot 50 has a circular control lever opening 60 through which the arm 30 of the control lever 22 is inserted. The knob 32 is then fitted onto the arm 30 and the knob flange 42 is forced through the circular control lever opening 60. The conical face 44 facilitating the insertion of the knob 32 through the circular control lever opening 60. The circular control lever opening 60 is provided with an inward extending flange 52. The flange 52 is provided with a downwardly extending foot 54. The inwardly extending flange 52 is received by the first groove 34 and the downwardly extending foot 54 is received by the second groove 36 A step 56 divides the flange 52 from the foot 54 and corresponds to the radial distance between the bases of the first and second grooves 34 and 36.

The present invention should not be limited to the above described embodiment, but should be limited solely by the claims that follow:

We claim:

1. A control lever for a work vehicle having a control console, the control lever comprising:

an arm;

a knob mounted to the arm, the knob having a cylindrical shaft, the cylindrical shaft having a first groove and a second groove, the first and second grooves adjoin one another, the first groove being deeper than the second groove;

a rubber boot extending between the knob and the control console, the rubber boot having a circular control lever opening, the circular control lever opening having an inwardly extending flange that is received in the first groove, a downwardly extending foot extends from the inwardly extending flange and is received in the second groove.

2. A control lever as defined by claim 1 wherein the knob is provided with a first radially extending face that is adjacent to the first groove, the first groove being positioned between the first radially extending face and the second groove.

3. A control lever as defined by claim 2 wherein the knob is provided with a knob flange that is located adjacent to the second groove so that the second groove is positioned between the first groove and the knob flange.

4. A control lever as defined by claim 3 wherein the knob flange is provided with a second radially extending face that is adjacent to the second groove.

5. A control lever as defined by claim 4 wherein the knob flange is provided with a conical face.

6. A control lever as defined by claim 5 wherein the inwardly extending flange and the downwardly extending foot are divided from one another by a step.

7. A control lever for a work vehicle having a control console, the control lever comprising:
- an arm;
- a knob mounted to the arm, the knob having a cylindrical shaft, the cylindrical shaft having a first groove and a second groove, the first and second grooves adjoin one another, the first groove having a base having a first diameter and the second groove having a base with a second diameter, the first diameter being smaller than the second diameter;
- a rubber boot extending between the knob and the control console, the rubber boot having a circular control lever opening, the circular control lever opening having an inwardly extending flange that is received in the first groove, a downwardly extending foot extends from the inwardly extending flange and is received in the second groove.

8. A control lever as defined by claim 7 wherein inwardly extending flange and the downwardly extending foot are divided form one another by a step.

9. A control lever as defined by claim 8 wherein the knob is provided with a first radially extending face that is adjacent to the first groove, the first groove being positioned between the first radially extending face and the second groove.

10. A control lever as defined by claim 9 wherein the knob is provided with a knob flange that is located adjacent to the second groove so that the second groove is positioned between the first groove and the knob flange.

11. A control lever as defined by claim 10 wherein the knob flange is provided with a second radially extending face that is adjacent to the second groove.

12. A control lever as defined by claim 11 wherein the knob flange is provided with a conical face.

* * * * *